US00RE45985E

(19) United States
(12) Reissued Patent
McAuley et al.

(10) Patent Number: US RE45,985 E
(45) Date of Reissued Patent: Apr. 26, 2016

(54) FACE MASK

(75) Inventors: Alastair Edwin McAuley, Auckland (NZ); Christopher Earl Nightingale, Auckland (NZ); Aidan Mark Shotbolt, Highland Park (NZ)

(73) Assignee: Fisher & Paykel Healthcare Limited, Auckland (NZ)

(21) Appl. No.: 29/382,614

(22) Filed: Jan. 5, 2011

Related U.S. Patent Documents

Reissue of:
(64) Patent No.: Des. 584,400
Issued: Jan. 6, 2009
Appl. No.: 29/210,289
Filed: Jul. 29, 2004

(51) LOC (10) Cl. ..... 29-02
(52) U.S. Cl.
USPC ..... D24/110.1

(58) Field of Classification Search
USPC ..... D24/110, 110.4, 110.5; 128/205.25, 128/206.12, 206.21, 206.28, 207.13
See application file for complete search history.

(56) References Cited

U.S. PATENT DOCUMENTS

| | | | | | |
|---|---|---|---|---|---|
| D271,246 | S | * | 11/1983 | Matheson et al. | D24/110.1 |
| D303,587 | S | | 9/1989 | Quinn et al. | |
| D305,166 | S | | 12/1989 | Quinn et al. | |
| 4,960,121 | A | * | 10/1990 | Nelson et al. | 128/206.24 |
| D323,908 | S | | 2/1992 | Hollister et al. | |
| D349,586 | S | | 8/1994 | Handke | |
| D397,215 | S | | 8/1998 | Hoftman | |
| D476,732 | S | * | 7/2003 | Smart | D24/110.4 |
| D492,992 | S | * | 7/2004 | Guney et al. | D24/110.1 |
| D493,885 | S | * | 8/2004 | Raje et al. | D24/110.1 |
| 6,860,269 | B2 | * | 3/2005 | Kwok et al. | 128/207.11 |
| D506,827 | S | * | 6/2005 | Jones et al. | D24/110.1 |
| D507,831 | S | * | 7/2005 | Rosenkranz et al. | D24/110.1 |
| 6,926,004 | B2 | * | 8/2005 | Schumacher | 128/206.27 |
| D515,204 | S | * | 2/2006 | Guney et al. | D24/110.1 |
| D519,207 | S | * | 4/2006 | Raje et al. | D24/110.1 |
| D549,332 | S | * | 8/2007 | Matsumoto et al. | D24/138 |
| D558,334 | S | * | 12/2007 | Stallard et al. | D24/110.1 |
| D586,458 | S | * | 2/2009 | Kooij et al. | D24/110.1 |
| D586,906 | S | * | 2/2009 | Stallard et al. | D24/110.1 |
| D591,420 | S | * | 4/2009 | Selvarajan et al. | D24/110.1 |
| D594,112 | S | * | 6/2009 | Nga et al. | D24/110.1 |

(Continued)

*Primary Examiner* — Phillip S Hyder
(74) *Attorney, Agent, or Firm* — Knobbe, Martens, Olson & Bear, LLP

(57) CLAIM

The ornamental design for a face mask, as shown and described.

DESCRIPTION

FIG. 1 is a perspective view of the face mask in accordance with our design;

FIG. 2 is a front elevational view of the face mask;

FIG. 3 is a left side elevational view of the face mask;

FIG. 4 is a right side elevational view of the face mask;

FIG. 5 is a top plan view of the face mask;

FIG. 6 is a bottom plan view of the face mask; and,

FIG. 7 is a rear elevational view of the face mask.

*The portions of the face mask shown in dashed lines form no part of the claimed design. The portions of the face mask within the dashed line boundary surrounding an interior of the seal of the face mask in FIG. 7 for no part of the claimed design.*

1 Claim, 7 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS

D597,202 S * 7/2009 Reid et al. ..... D24/110.1
D597,660 S * 8/2009 Maurer ..... D24/110.1
D597,661 S * 8/2009 Reid et al. ..... D24/110.1
D612,932 S * 3/2010 Davidson et al. ..... D24/110.1
D665,494 S * 8/2012 Stallard et al. ..... D24/110.1
2003/0034034 A1* 2/2003 Kwok et al. ..... 128/206.21
2004/0118406 A1* 6/2004 Lithgow et al. ..... 128/206.24

* cited by examiner

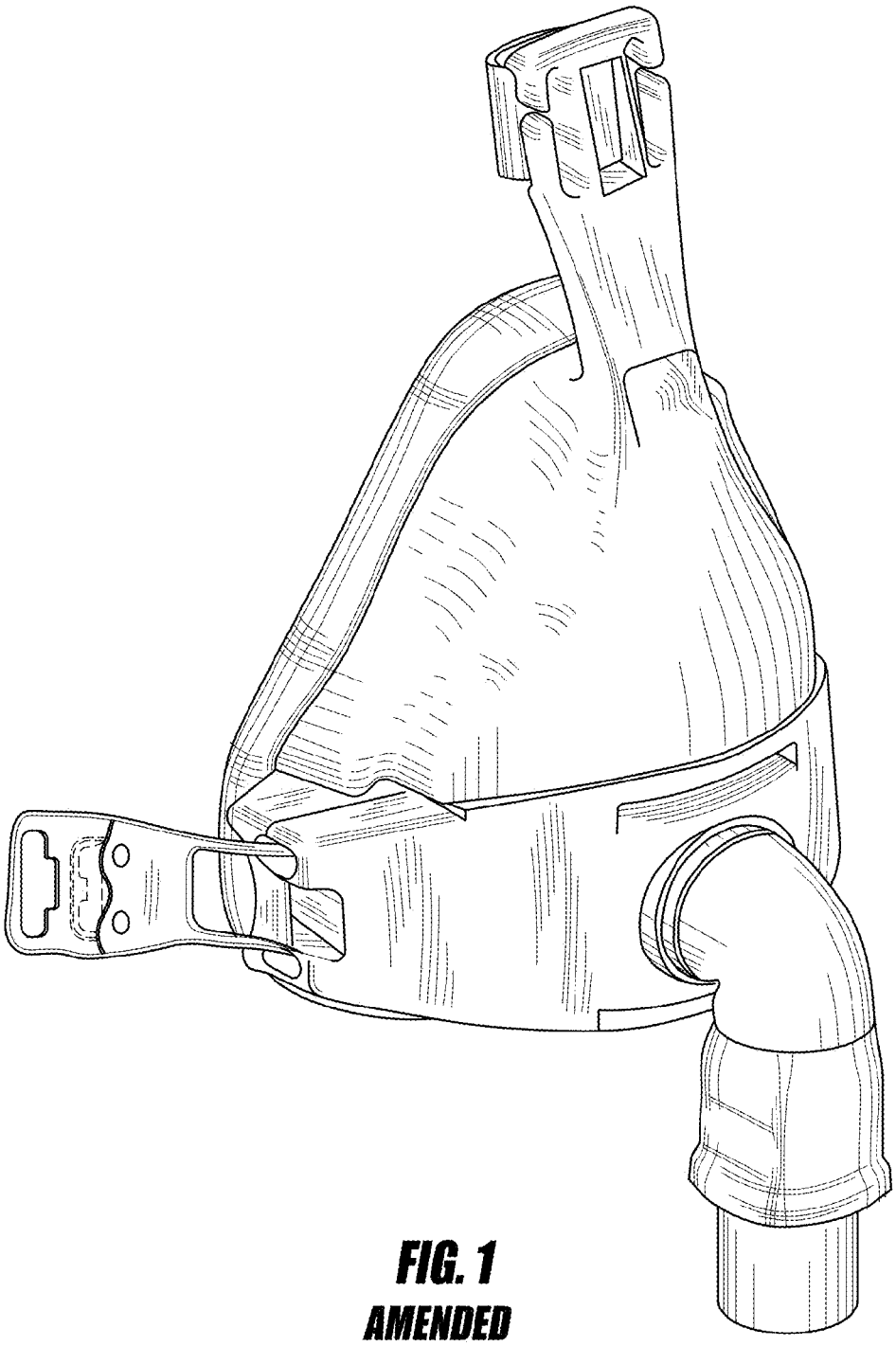
FIG. 1
AMENDED

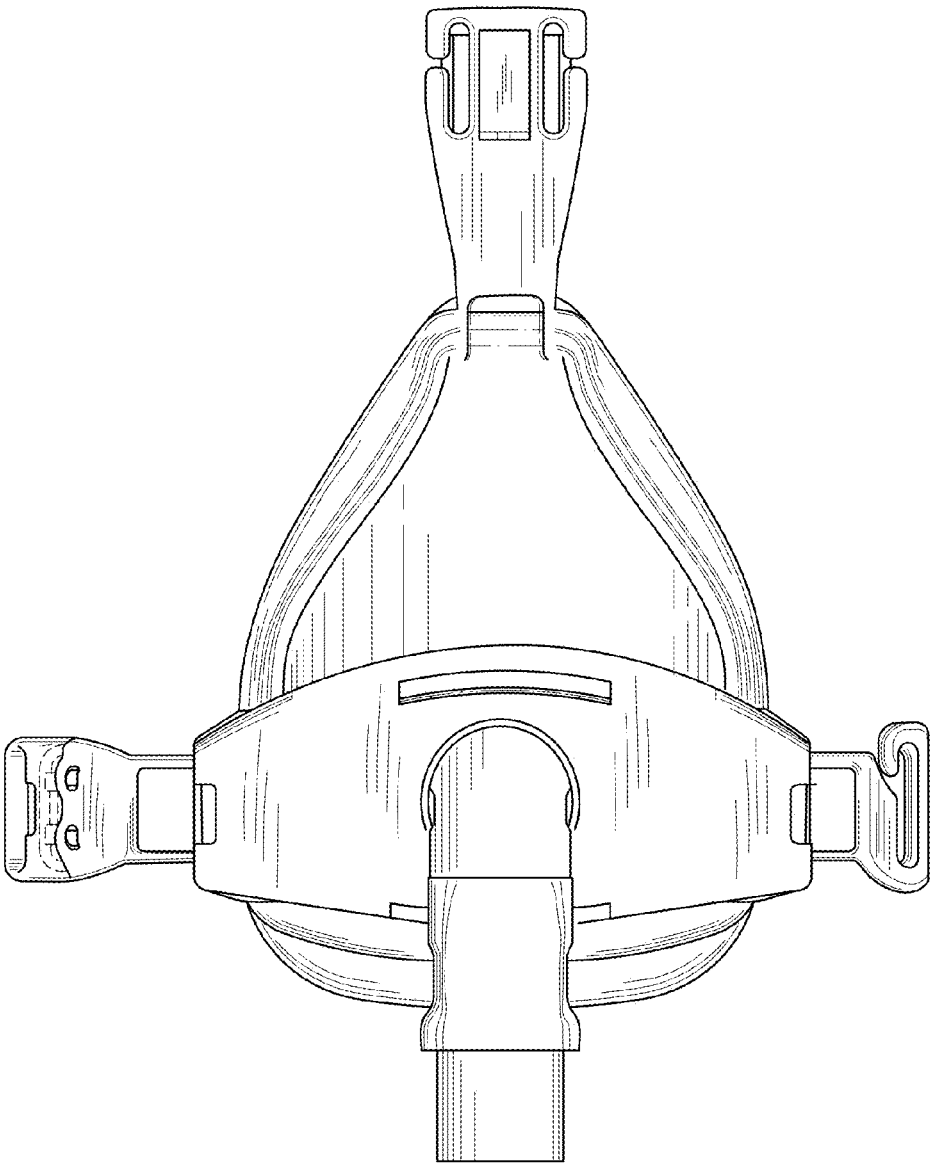
FIG. 2
AMENDED

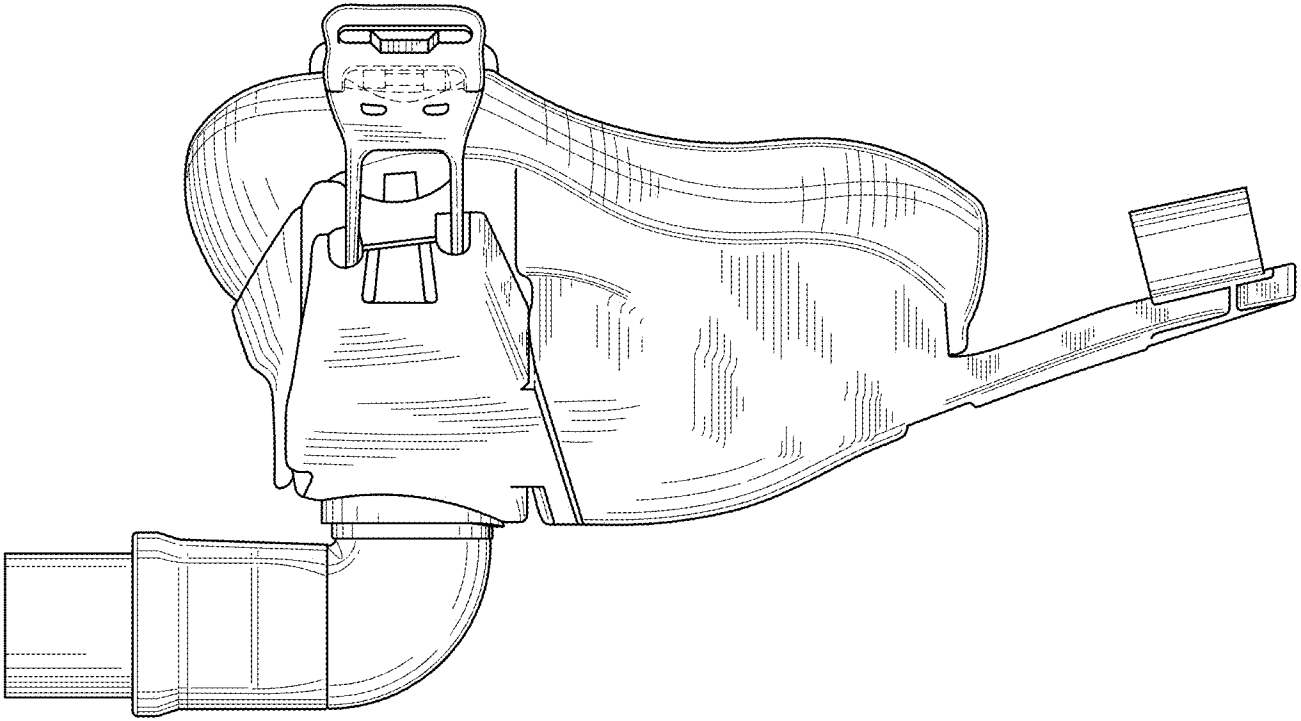
FIG. 3
AMENDED

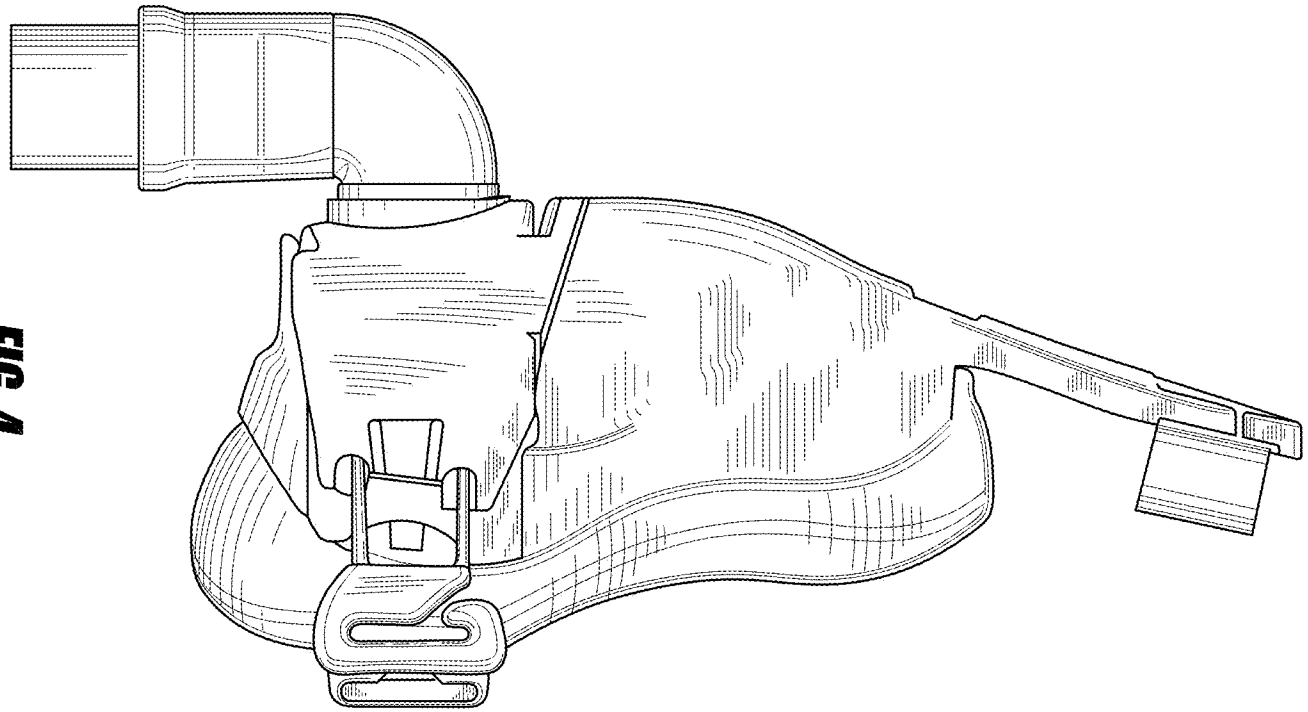
FIG. 4
AMENDED

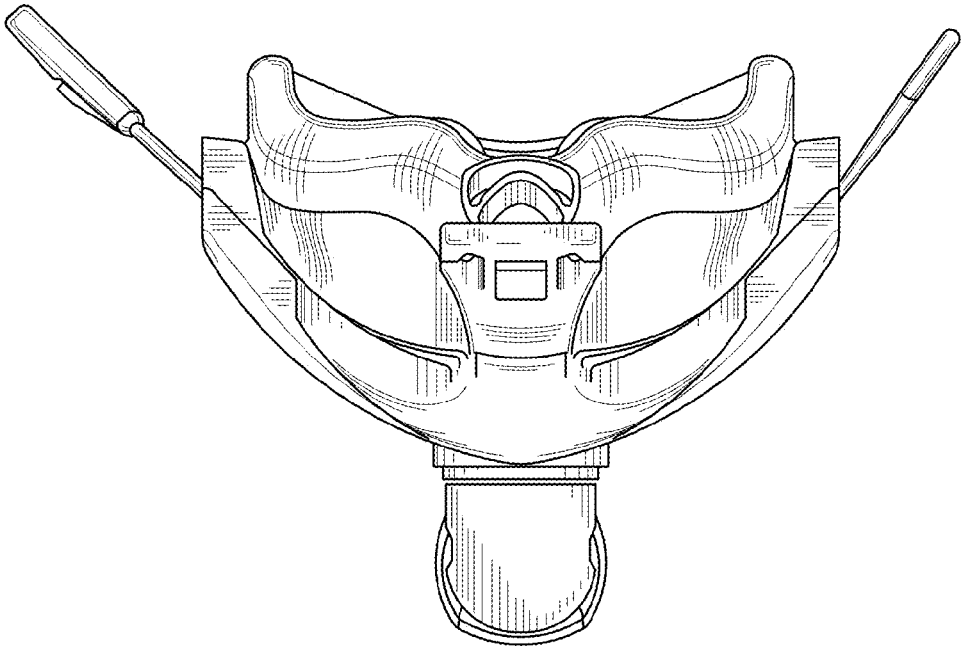
FIG. 5
AMENDED

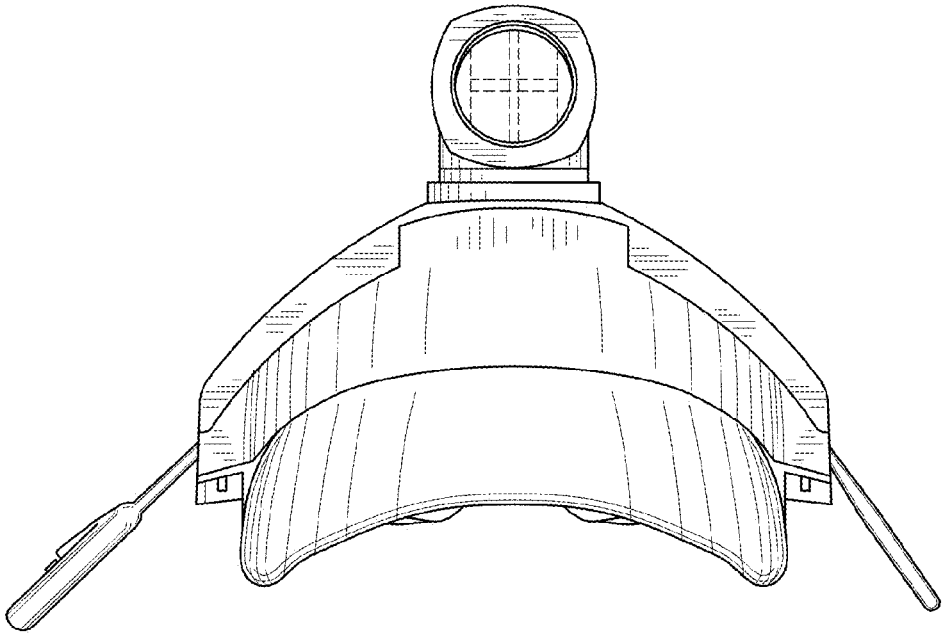
FIG. 6
AMENDED

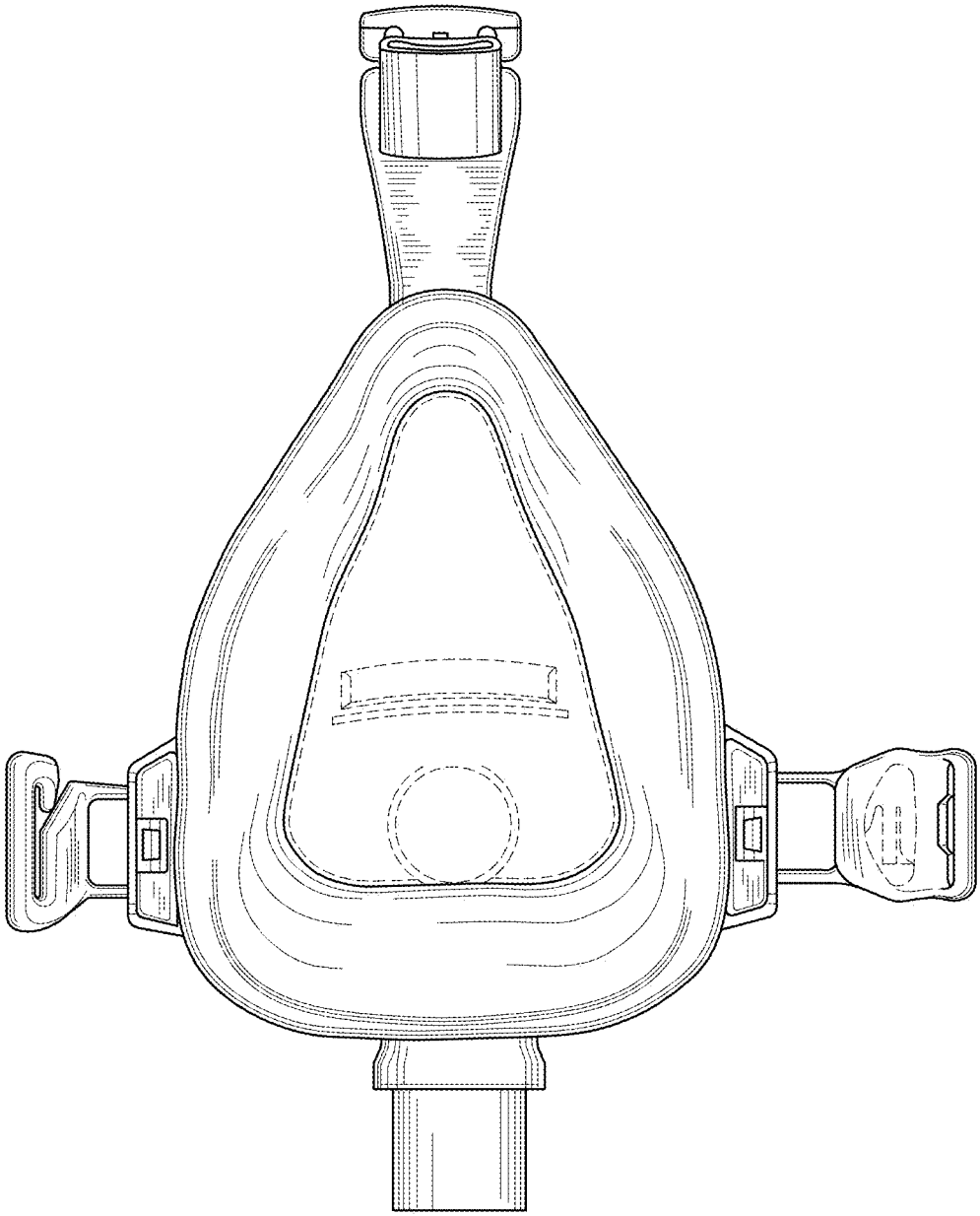
FIG. 7
AMENDED